IMPROVED WEIGHT
DANIEL B. LACY INVETOR
D.B.Lacy, T.T.Lacy, I.A.Lacy Assingees
4115
Fig. 1. REISSUED SEP 6 1870
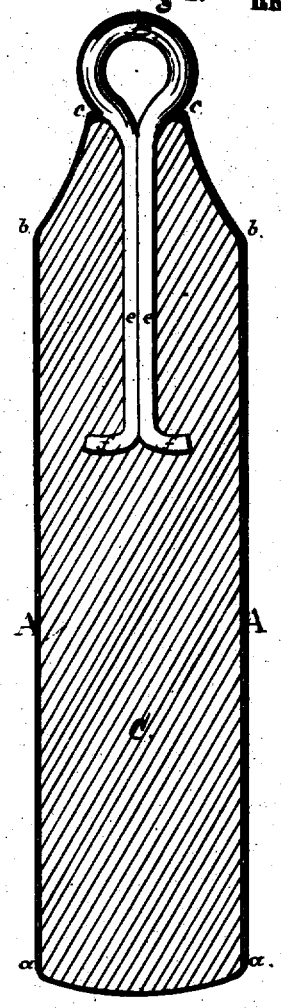
Fig. 2.
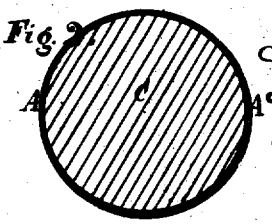
Witnesses
Jas. G. E. Lamed
Fred B. Sears
Daniel B. Lacy.
Thomas T. Lacy.
Isaac A. Lacy
by their atty.
L. D. Law

United States Patent Office.

DANIEL B. LACY, OF MOTT HAVEN, NEW YORK, ISAAC A. LACY, OF SAUGERTIES, NEW YORK, AND THOMAS T. LACY, OF JERSEY CITY, NEW JERSEY, ASSIGNEES, BY MESNE ASSIGNMENTS, OF DANIEL B. LACY.

Letters Patent No. 58,172, dated September 18, 1866; reissue No. 4,115, dated September 6, 1870.

IMPROVEMENT IN WEIGHTS FOR SASHES, CLOCKS, &c.

The Schedule referred to in these Letters Patent and making part of the same.

*To all whom it may concern:*

Be it known that DANIEL B. LACY, of Mott Haven, in the county of Westchester and State of New York, invented a new and useful Improvement in Weights for Window-Sashes, Clocks, &c.; and that the following is a full, clear, and exact description thereof, reference being had to the accompanying drawing, and to the letters of reference marked thereon and making a part of this specification.

This invention consists in constructing weights for window-sashes, clocks, and other uses, with casings of sheet-iron or other suitable metal, and filling such casings with slag from furnaces, whereby such weights can be manufactured at a much less cost, and thus a better article than when made of cast-iron in the usual way.

Figure 1 is a longitudinal section of a weight constructed with an exterior casing and filled with slag.

Figure 2 is a transverse section of the same.

Similar letters of reference indicate corresponding parts in both figures.

A represents the exterior case or shell, which may be made of sheet-iron or other suitable metal, and which may be of any desired shape; but, when the weight is designed for a clock or window-sash, it is preferable to be cylindrical in its main length from *a* to *b*, fig. 1.

Such case is open at its lower end, *x*, and usually has its upper end tapering or conical, as shown at *b c*, with an orifice or opening in the top thereof, at *d*, through which the shank *e* of the ring-staple B passes into the case.

Such ring-staple may be made of wrought or malleable iron, and the inner or lower end of its shank *e* is formed with lateral projections, or may be simply made somewhat thicker or larger than the body or main length of such shank, in order that the staple will be properly secured and held in place by the filling placed in the case and surrounding the shanks.

The cord by which the weight is suspended is attached to a ring upon the outer end of such staple.

The case A may be made by bending or folding the sheet-metal, of which it is formed, into the proper shape, and securing the adjacent edges together by any suitable means.

The case A being constructed, and the shank *e* of the ring-staple B inserted therein, as before described, the case is inverted, and has its upper or tapering end, together with the ring or head of the staple B, solidly imbedded in earth, molding-sand, or equivalent substance, with its open bottom-end *x* uppermost, the sand or earth surrounding the end of the case closing up the interstices around the shank *e*, where it passes into the case, and, at the same time, holding the case in an upright position, and also keeping the ring-staple B in its proper position with reference thereto.

The case is then filled with molten slag, poured in at the opening of such case, which, when cooled, forms a solid and heavy filling within the case, as shown at C, and constitutes the greatest portion of the weight.

The slag used should be of such kind, or have such density, as to make the weight sufficiently heavy, regard being had to the diameter and length of weight required for different uses.

Inasmuch as the slag is of little intrinsic value, and the metal cases, when of iron, can be made at a very moderate cost, and the operation of filling may be performed by boys or unskilled and inexperienced persons, it will be apparent that the weights may be manufactured at a much less cost than those formed of cast-iron in the ordinary way.

This improved weight is also much better adapted for use for very many purposes than those heretofore made, inasmuch as the outer surface, being formed of sheet-iron or sheet metal, may be made much smoother than that of weights made of coarse cast-iron in the usual way, and are thus rendered much less liable to cut or abrade the cords by which they are suspended, by pressing and comingin contact with the same.

What is claimed as new is—

1. The construction of sash and other weights with an outer case of sheet metal and a filling of slag, substantially as set forth.

2. The construction of weights with an outer case of sheet metal and a filling of slag, and a malleable or wrought-metal ring or shank, around which the slag is cast, substantially as herein set forth.

DANIEL B. LACY.
THOMAS T. LACY.
ISAAC A. LACY.

Witnesses as to D. B. & T. T. LACY:
S. D. LAW,
FRED. B. SEARS.

Witnesses as to ISAAC A. LACY:
BENJ. M. COON,
EVANS P. BRINK.